Nov. 5, 1963

A. E. JACOBSON, JR 3,109,447

BALL COCK VALVE

Filed June 22, 1962

INVENTOR.
ALVIN E. JACOBSON JR.

BY

ATTORNEYS

United States Patent Office 3,109,447
Patented Nov. 5, 1963

3,109,447
BALL COCK VALVE
Alvin E. Jacobson, Jr., Grand Haven, Mich., assignor to Grand Haven Brass Foundry, Ottawa, Mich., a partnership
Filed June 22, 1962, Ser. No. 204,370
2 Claims. (Cl. 137—436)

This invention relates to valves, and more particularly to a ball cock valve for toilet flushing apparatus and the like.

It is a well-known fact that flushing toilets are ordinarily very noisy. Various types of conventional ball cock valves formed of tubing, fittings, special valve elements and the like have been utilized heretofore in attempts to lower the noise level of these apparatuses, but the quieting action has been only minor. The turbulent water flow through the valve is believed to cause a large portion of the noise. The tubing has a natural tendency to vibrate in an undesirable manner. Also, a noisy period occurs just as the valve approaches complete closing, but does not quite achieve it, since the high velocity water whistling through the tiny opening tends to cause the valve to hang up temporarily while the whistling continues. It has also been determined that another noise-contributing factor results from the location of the overflow passageway outlet from the valve chamber right adjacent the valve seat. However, it has been necessary with conventional valves to keep the overflow outlet adjacent the valve to achieve the necessary water pressure for the supplemental flushing action.

It is therefore an object of this invention to provide a unique, new ball cock valve which is extremely quiet in operation, including the period just before complete closing of the valve. The valve has a rapid-closing valving action to thereby eliminate the hanging-up factor characteristic of prior structures.

It is another object of this invention to provide an integral, unitary, quietly operating ball cock valve enabling the removal of the overflow passageway away from the valve seat due to a unique configuration of the apparatus.

It is a still further object of this invention to provide a novel ball cock valve having minimum turbulence through the control valve, minimum turbulence in the annular chamber around the valve seat, minimum turbulence caused by the overflow outlet passageway, minimum turbulence from the outlet passageway into the water tank, and practically no noisy vibration.

It is another object of this invention to provide a ball cock valve having an overflow outlet removed to a position substantially away from the valve seat, while still maintaining effective water pressure to the overflow passageway.

These and several other objects of this invention will be apparent upon studying the following specification in conjunction with the drawings in which.

Basically, the inventive ball cock valve has a unitary, integral cast housing including a water inlet passageway, an annular chamber at the top of the inlet passageway, a downwardly directed outlet paageway leading off from the chamber and having a retricted area, and an overflow passageway at a substantial distance below the annular chamber, leading off from the outlet passageway prior to the most restricted portion of the outlet passageway. The lower portion of the valving member has a conical surface, including a resilient insert. Valve means, including a valve seat and a valve member, is located at the top of the inlet passageway, centrally of the annular chamber. The valve seat includes an annular seating surface having a frusto-conical configuration at the same angle as a cooperating conical end on the valve member.

It should be noted that the inventor herein does not profess to know all of the scientific reasons why the features of the novel ball cock valve achieve the extremely quiet operation, but does know that the specific features as explained and claimed herein do result in an extremely quietly operating ball cock valve. It has gained acceptance by purchasers who are so enthusiastic that even the assignee herein, a manufacturer of conventional ball cock valves for many years, was somewhat surprised.

The unique features which effect this quiet operation are firstly, the unitary, integral non-vibratory cast structure; secondly, the unique configuration and interrelationship of the valve member and the valve seat; thirdly, the location of the overflow passageway and the specific configuration of the outlet passageway associated therewith; fourthly, the integral interrelationship of one wall portion of the outlet passageway with the inlet passageway, combined with the flared supporting and reflecting surface at the base of the structure.

Figure 1:
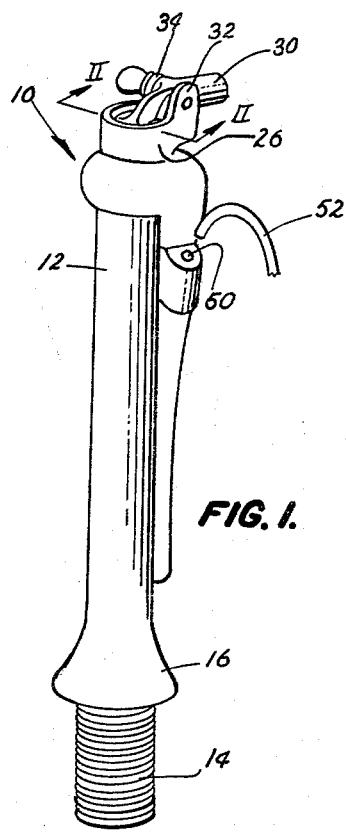
FIG. 1 is a perspective view of the novel ball cock valve.
Figure 2:
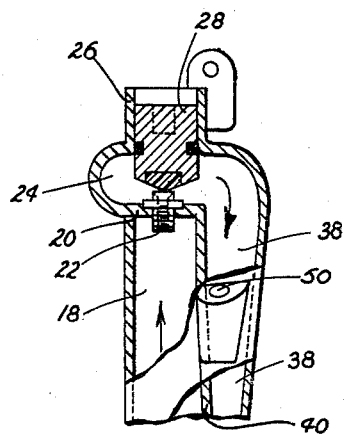
FIG. 2 is a fragmentary, side elevational, sectional view taken on plane II—II of FIG. 1.
Figure 3:
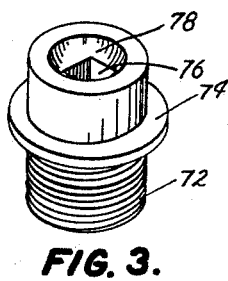
FIG. 3 is an enlarged view of the valve seat inserted in the apparatus of FIG. 2.
Figure 4:
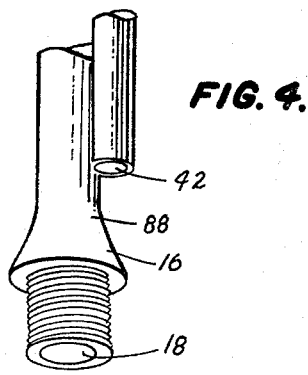
FIG. 4 is a fragmentary perspective view of the bottom half of the ball cock valve.
Figure 5:
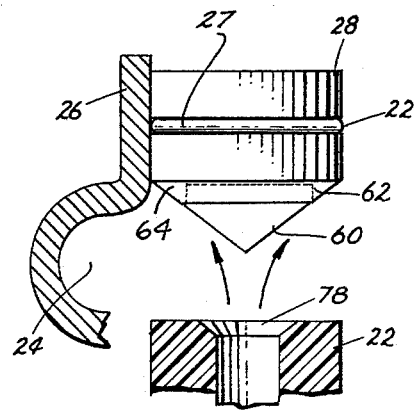
FIG. 5 is a fragmentary side elevational sectional view of the valve member and valve seat, and their relation ship to the annular chamber of the novel ball cock valve.

Referring to the drawings, the novel ball cock valve 10 includes an integral cast housing 12 having connecting thread means 14 at the base thereof for attachment to a water tank, and an annular flared support collar or portion 16 adjacent threads 14, to support the ball cock valve 10 on the base of the water tank. The integral housing includes an inlet passageway 18 extending from the base up to the top and terminating in an annular flange 20 adapted to support a valve seat insert 22. An annular chamber 24 is defined by the integral housing around the valve seat and terminates in an upper neck 26 within which the valve member 28 with packing 27, slidably reciprocates to cooperate with valve seat insert 22. This valve member is controlled by lever 30 which is pivoted between the ears 32 and 34 cast integral with the housing. Lever 30 is controlled by a float (not shown) in a conventional manner. Leading off from annular chamber 24 and extending downwardly is water outlet passageway 38 having one wall portion 40 in common with inlet passageway 18. The outlet port 42 of the outlet passageway therefore has one portion of its periphery coincident to the outer wall of the inlet passageway. The outlet passageway terminates above flared portion 16 as illustrated in FIG. 4.

Positioned at a substantial distance beneath the annular chamber 24 and leading off from the outlet passageway 38 is an overflow passageway 50 adapted to cooperate with a conventional overflow tube 52 to provide the supplemental flushing in a circular fashion around the periphery of a toilet in a well-known manner. The outlet passageway 38 includes a restricted portion, here shown gradually restricted in the form of a tapered constricting nozzle beneath the overflow passageway 50. The gradual constriction minimizes turbulence.

Referring again to valve member 28, the lower surface of the valve includes a resilient insert 60 preferably of rubber or a similar material to seal tightly. The complete lower end of the valve 28 comprises a conical surface, including the annular metallic portion 62 around the rubber insert 60. It has been found that this complete conical surface contributes substantially to the quiet operation of the novel valve. It is believed that this configuration effects optimum water deflection into the annular chamber 24. It has been found preferable to have the annular shoulder 64 recede slightly into neck portion 26, past the edge of the annular chamber 24, in the full-open position of the valve member for the most quiet operation. The scientific reasons behind this are not clearly understood.

Valve seat insert 22 includes lower threads 72 enabling threaded attachment into the annular collar 20, and a shoulder 74 limiting the insertion into collar 20. It also preferably includes a square passageway 76 to enable simple removal and insertion with a tool. A very important feature of this insert seat has been found to be the angle of the frustoconical seating surface 78. It has been found that by making this surface 78 of the same angle as the conical surface on the valving member 28, not only does optimum sealing occur, but also rapid closing action is achieved, wherein the valving member does not hang-up in the almost-closed position. In other words, with horizontal valve seat surfaces used heretofore, the high water pressure in the small annular opening between the almost-closed valving member and the valve seat and causing a continued, loud hissing sound, tended to hold the valving member up so that this hissing noise continued for a substantial period of time. It has been found that by using the angular, annular valve seat 78, when the angle is the same as the conical lower end of valving member 28, that the final closing action occurs very rapidly, and with a minimum of noise. Applicant does not fully understand the scientific reasons causing the result, but does know that this result definitely occurs.

Referring now to overflow passageway 50, it has been found that by placing this passageway a substantial distance beneath annular chamber 24 and leading it off from outlet passageway 38, the noise generally associated with this overflow turbulence of water emerging from the valve seat and passing to the overflow outlet, is substantially eliminated. It has heretofore been impossible to move the overflow passageway 50 from the area of the annular chamber 24 near the valve seat, since it has been impossible to achieve sufficient water pressure adjacent the overflow passageway 50 to obtain a proper supplemental flushing action. In applicant's unique new integral structure, a gradually constricted outlet passageway 38 is formed in the integral casting. The integral overflow passageway 50 is positioned to lead off outlet passageway 38 a substantial distance below the valve seat. Sufficient back pressure is achieved by the restriction to obtain proper overflow water pressure, while simultaneously elminating the noise ordinarily caused thereby.

Another feature contributing to the quiet operation is the double function of the flared portion 16 in combination with the outlet passageway. Portion 16 not only serves to support the ball cock valve on a water tank bottom, but also serves to provide deflection of outlet water from port 42 of the outlet passageway 38. Since the outlet passageway has a wall in common with the inlet passageway, the water is directed down the side wall portion 88 beneath the terminal part of the outlet passageway, and the flared portion 16 so that the water is deflected and fanned out by flared portion 16.

By combining these unique features, an operating ball cock valve is actually achieved. Various obvious modifications may occur to those in the art upon studying the foregoing principles taught, and the form of the invention illustrated. These obvious modifications are deemed to be part of this invention, which is to be limited only by the scope of the appended claims and the reasonably equivalent structures to those defined therein.

I claim:

1. A ball cock valve comprising: a unitary integral cast housing including an upwardly directed inlet passageway and a downwardly directed outlet passageway; the bottom of said housing including an integral flared annular portion and adjacent connecting means serving to support and attach said ball cock valve to a water tank surface; a wall portion of said inlet passageway also forming a wall portion of said outlet passageway, with said outlet passageway terminating above said flared portion; a valve seat and member positioned at the top of said passageway, whereby water ejected from said outlet passageway will be forced along the outer wall of said outlet passageway and be fanned out by said flared portion before striking said tank surface.

2. A ball cock valve comprising: a unitary, integral cast housing including an upwardly directed inlet passageway, an annular chamber around the top of said inlet passageway, a downwardly directed outlet passageway leading off said chamber, and an overflow passageway leading off said outlet passageway; said overflow passageway being located a substantial distance downstream of said chamber, and said outlet passageway being restricted adjacent said overflow passageway to achieve proper overflow water pressure; a valve seat adjacent the top of said inlet passageway, a valve member cooperable with said valve seat, said valve member having a conical lower end including a resilient insert; and said valve seat having an annular seating surface at the same angle as said conical end, whereby water passing through said housing has a minimum of turbulence, said integral housing including a connecting means at the base thereof and an annular flared support portion adjacent the connecting means; and a wall portion of said inlet passageway also forming a wall portion of said outlet passageway, with said outlet passageway terminating above said flared portion, whereby water ejected from said outlet passageway will be forced along the outer wall of said outlet passageway and be fanned out by said flared portion.

References Cited in the file of this patent

UNITED STATES PATENTS

| | | |
|---|---|---|
| 236,311 | Doherty | Jan. 4, 1881 |
| 1,096,237 | Gehrke | May 12, 1914 |
| 1,323,960 | Burrill | Dec. 2, 1919 |
| 2,283,945 | Peterson et al. | May 26, 1942 |
| 2,287,150 | Taylor | June 23, 1942 |
| 2,711,186 | Perez | June 21, 1955 |